Dec. 1, 1959 W. S. GUBELMANN 2,915,159
SPEED-RESPONSIVE CLUTCH

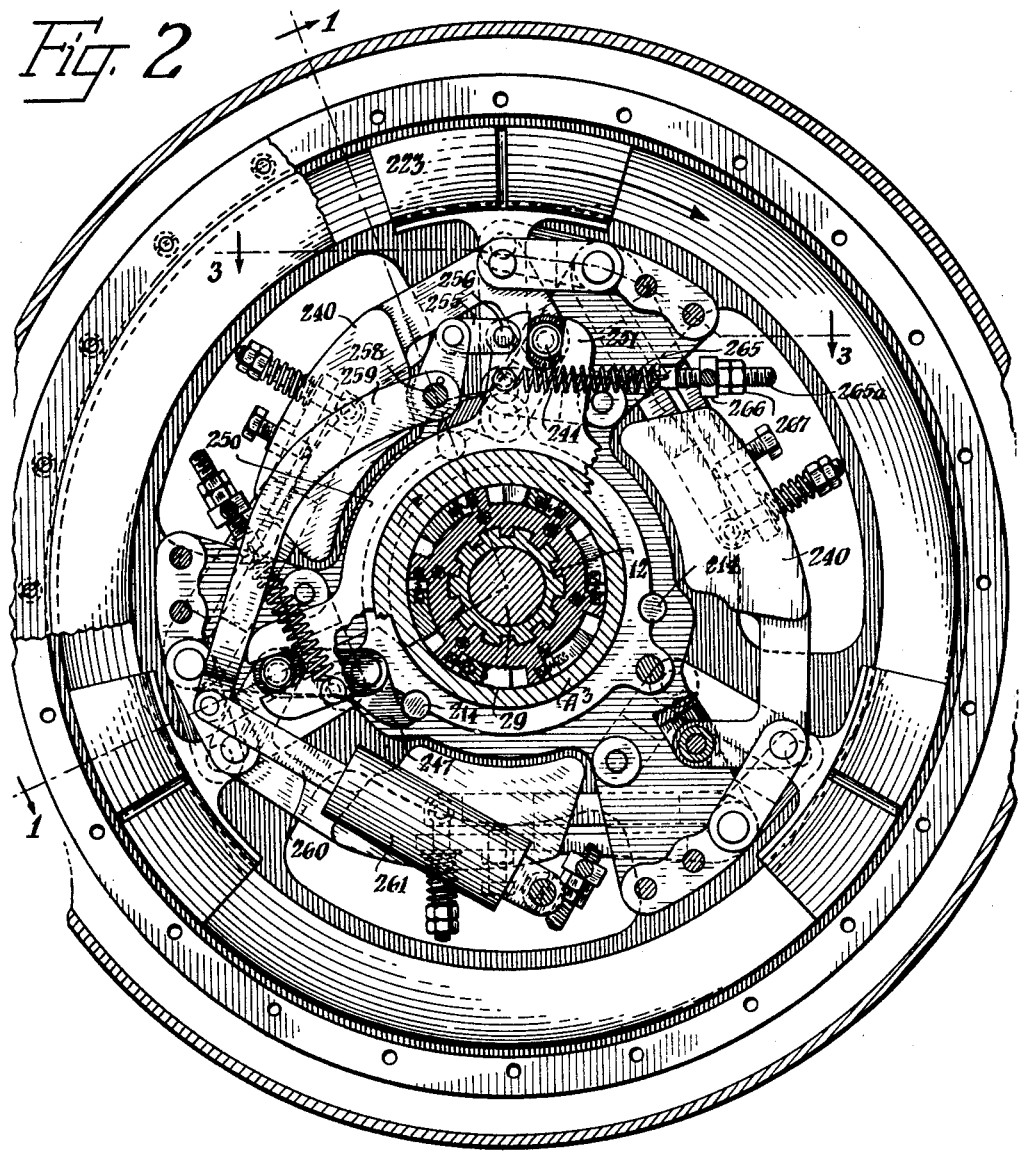

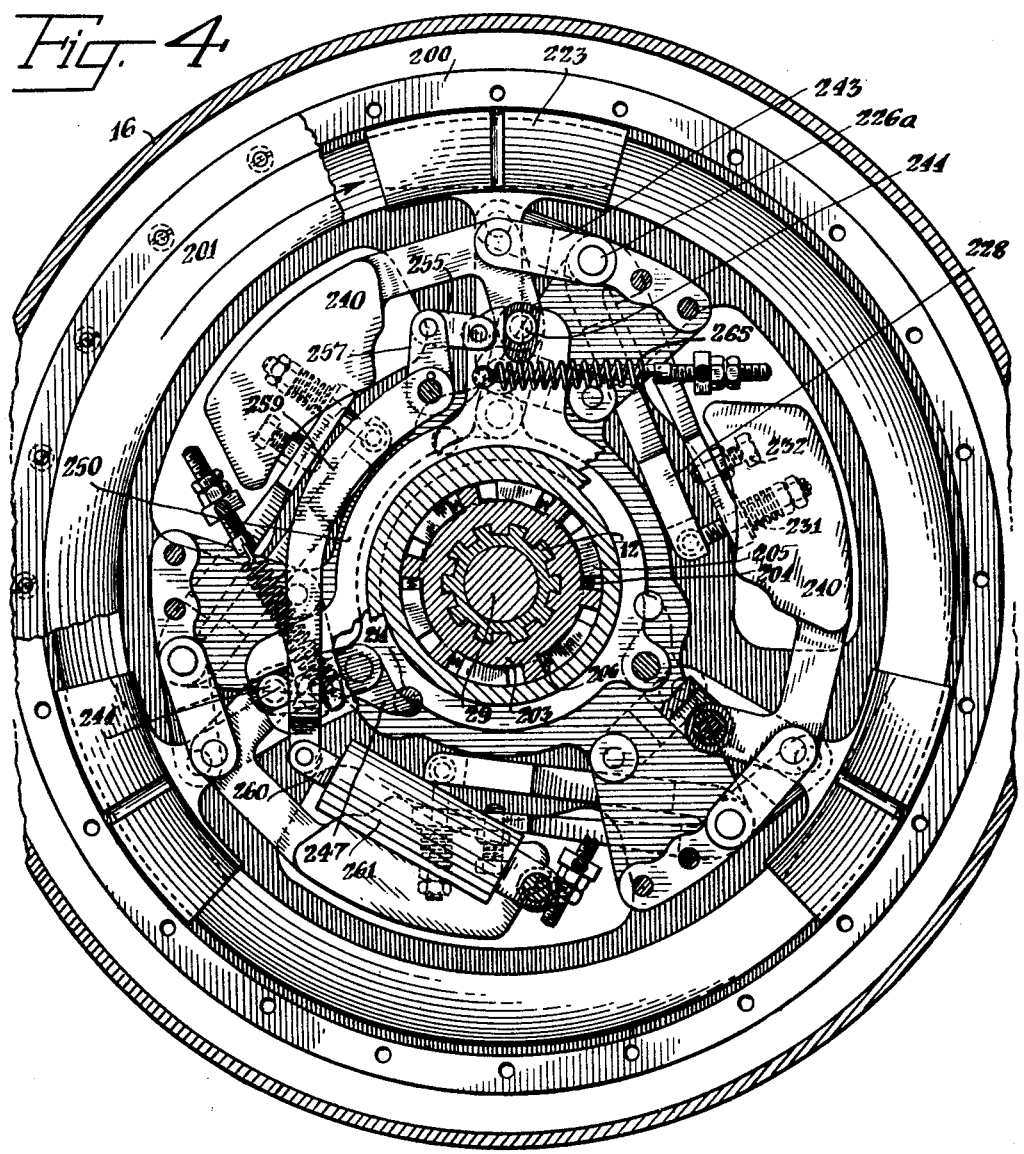

Original Filed July 8, 1944 8 Sheets-Sheet 4

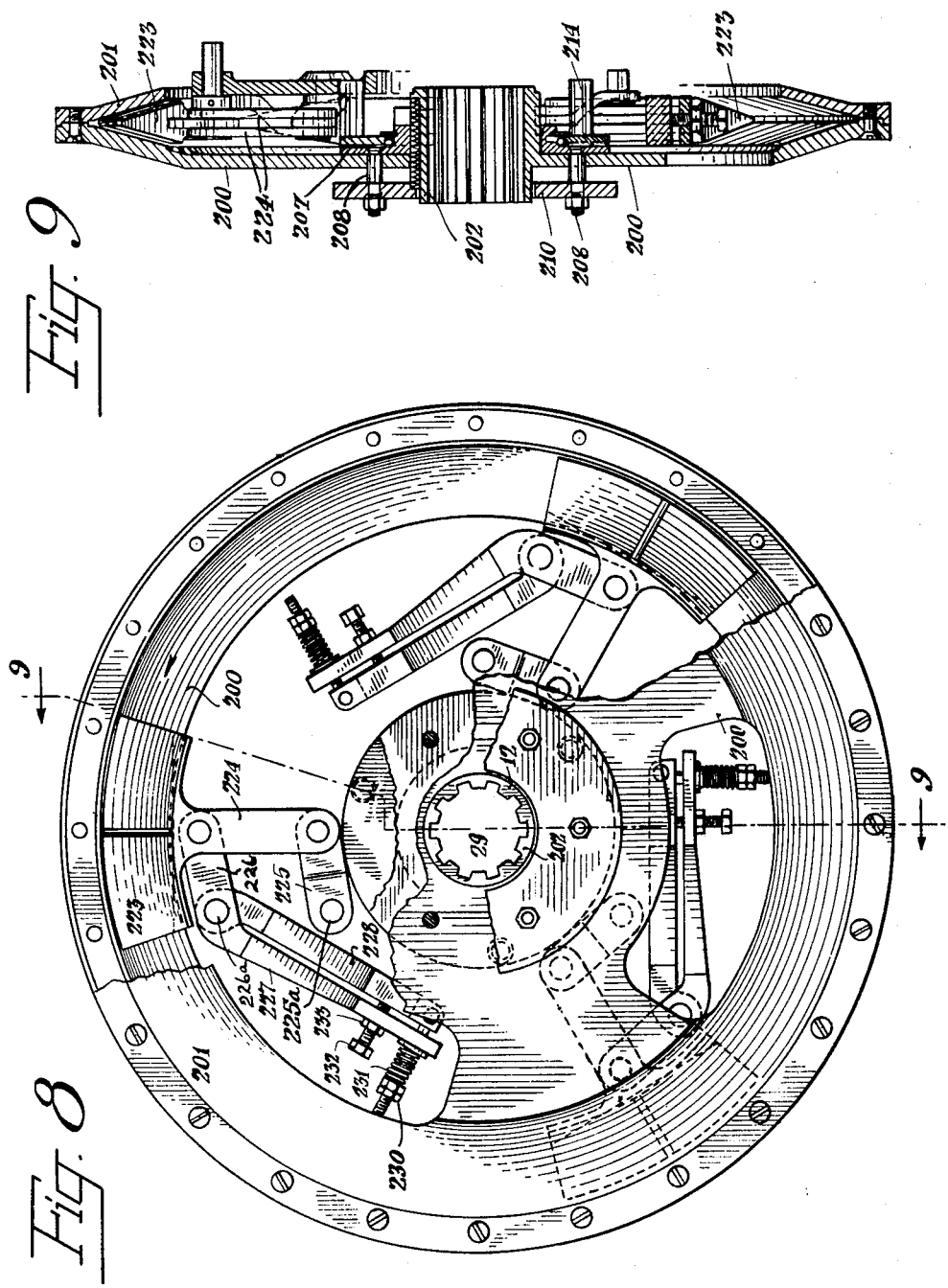

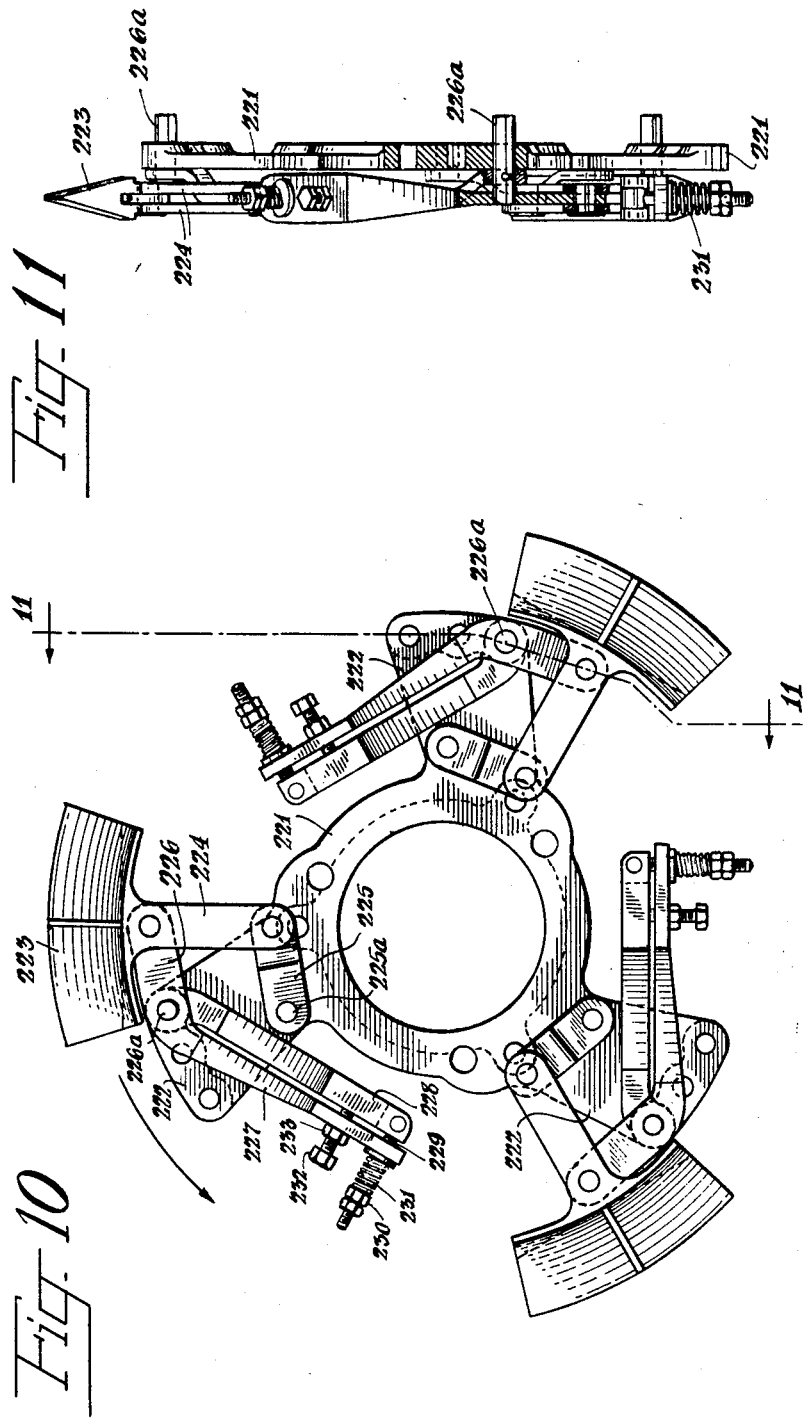

Dec. 1, 1959 W. S. GUBELMANN 2,915,159
SPEED-RESPONSIVE CLUTCH
Original Filed July 8, 1944 8 Sheets-Sheet 7
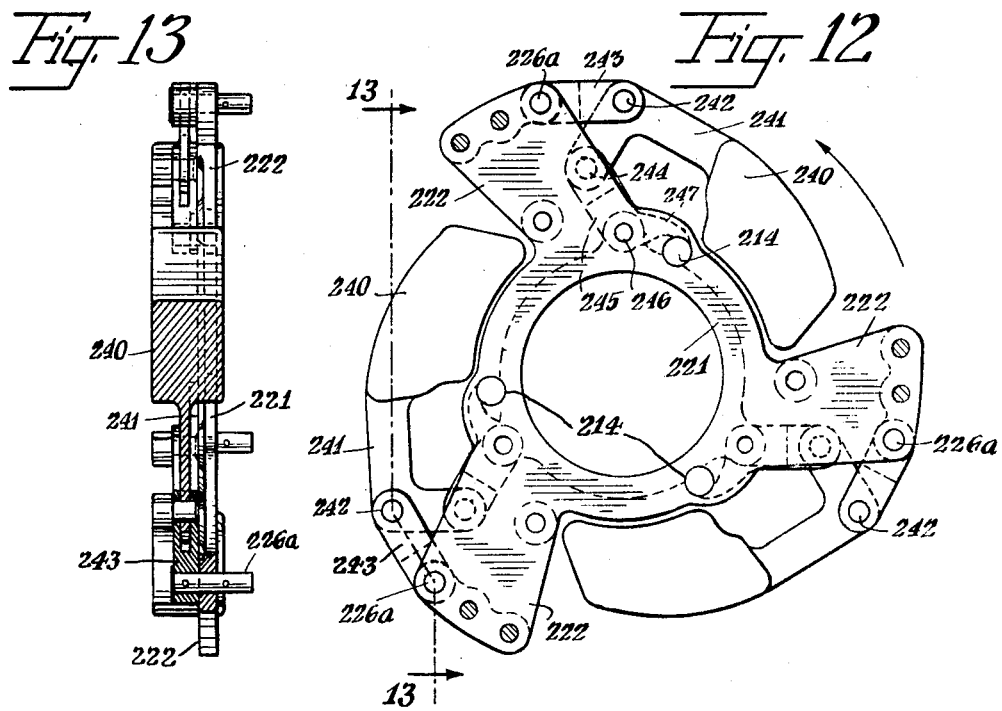
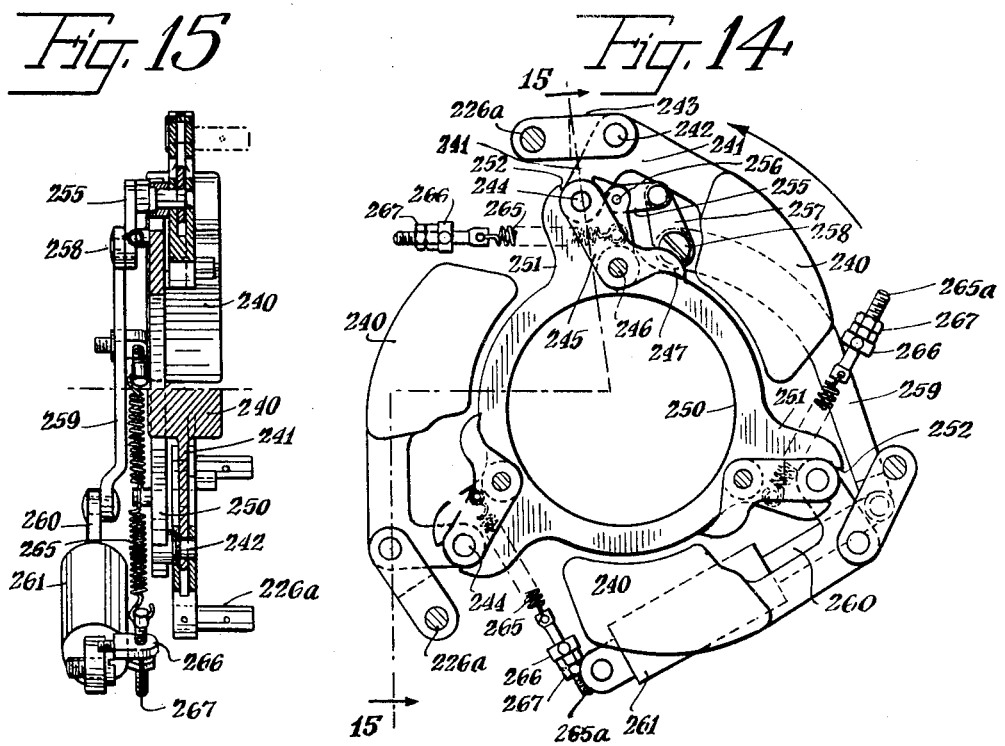

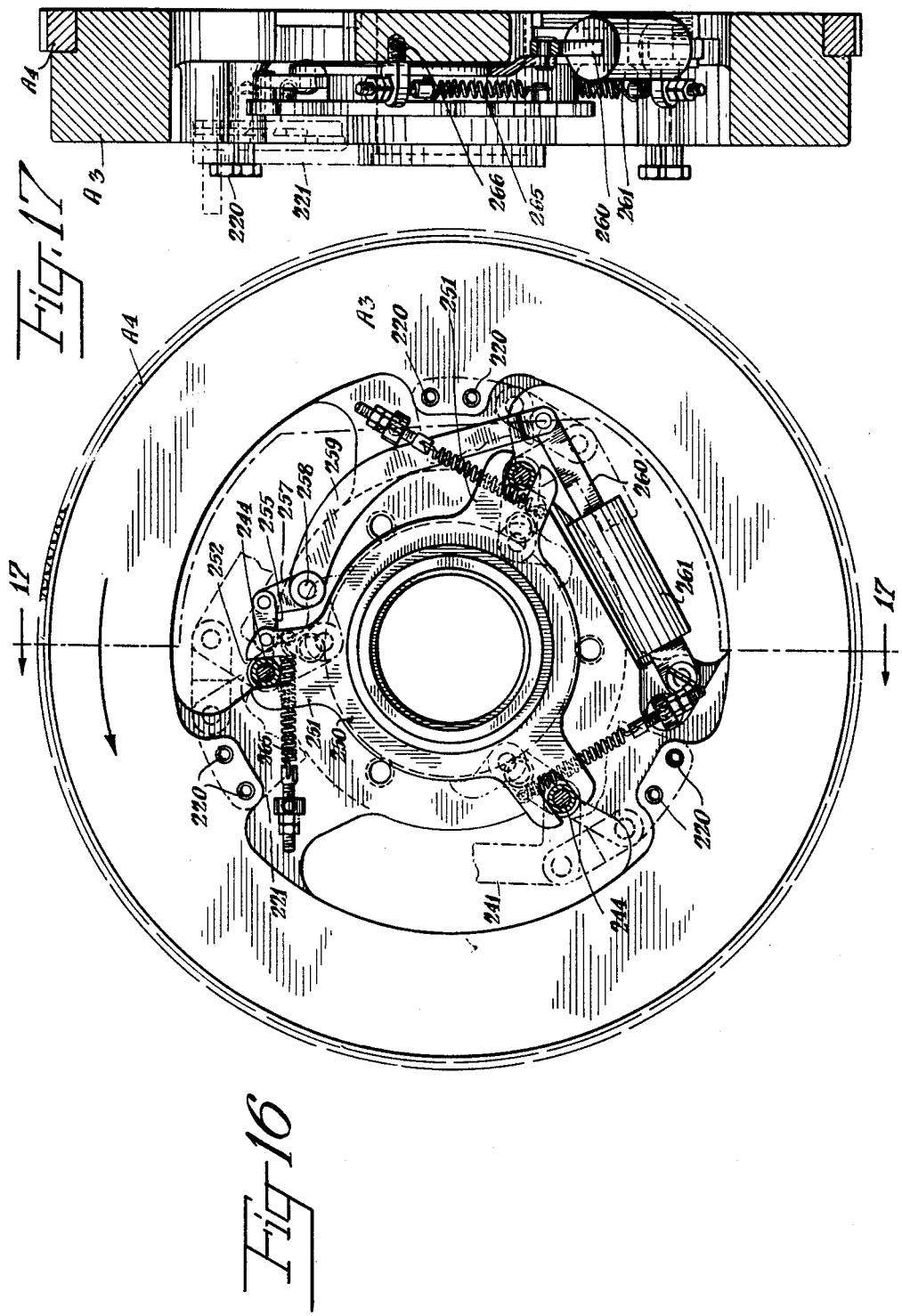

United States Patent Office 2,915,159
Patented Dec. 1, 1959

2,915,159

SPEED-RESPONSIVE CLUTCH

William S. Gubelmann, Convent, N.J., assignor to Realty and Industrial Corporation, Convent, N.J., a corporation of New Jersey Original application July 8, 1944, Serial No. 544,030, now Patent No. 2,636,401, dated April 28, 1953. Divided and this application April 10, 1953, Serial No. 348,013

25 Claims. (Cl. 192—105)

This invention relates to a speed-responsive clutch, particularly a clutch adapted for use in automobiles, trucks, etc. although capable of use for other purposes, this application being a division of applicant's application S.N. 544,030, filed July 8, 1944 and now Patent No. 2,636,401, issued April 28, 1953.

It is an object of the invention to provide an improved automatic speed responsive clutch having an input member connected for rotation by a power source (such as an internal combustion engine), an output member, and combinations of means therebetween providing gradual, smooth, and positive drive coupling for rotating the output member when rotative speed of the power source attains and exceeds a certain magnitude.

Another object is to provide a speed responsive clutch having a combination of means for gradually and increasingly multiplying the power of centrifugal force for operating its coupling means to positively drivingly couple its input member, rotatable by a power source, with its output member when the power source attains predetermined speeds of rotation, and means adjustable to be effective for preventing coupling irrespective of rotative speeds, which is desirable for testing or for warming up the power source, and adjustable to be ineffective for permitting such coupling when sufficiently high rotative speeds are attained; the adjustable preventing means being arranged to so coact with the coupling means that when rotative speeds are above a certain rate, the adjustable means while effective is not adjustable to be ineffective, or that while ineffective it is not adjustable to be effective, thereby providing against undesirable sudden and undue strains that would be created if coupling and uncoupling were accomplished at high rotative speeds.

Another object is to provide a speed responsive clutch having a combination comprising means effective for drivingly coupling its input member, rotatable by a power source, with its output member, means adjustable for at times rendering the coupling means ineffective and thereby preventing coupling irrespective of the speeds of rotation, and means for connecting the output member with the input member by means of a one-way coupling in such a way that whenever torque tends to rotate the output member forwardly relative to the input member, the output member is coupled to for driving the input member but that when the input member rotates forwardly relative to the output member the connecting means is not effective for coupling the members. Whereby the engine is made always available as restraining means as for controlling a vehicle when in motion while the clutch means is effective, for controlling the vehicle when in motion while the clutch means is not effective due to rotative speeds being below a certain magnitude, and providing the power source as a braking means when the vehicle is parked on a downgrade with torque being exerted on the output member while the power source is not operating, and further providing the possibility of rotating the power source to start it by moving the vehicle so as to rotate the output member forwardly relative to the input member whereupon, with the clutch rendered ineffective by the preventing means, the started power source may be speeded up without causing the output member to be driven thereby.

Another object is to provide a speed responsive clutch having a clutch member connected to the clutch output member, coupling means rotatable by the clutch input member which is rotatable by a source of power; the coupling means being adapted to move radially for coupling the clutch member, and centrifugally influenced means rotatable by the power source and connected to for actuating the clutch coupling means to drivingly couple the clutch members and thereby the connected output member. This combination of elements, so disposed, provides improved gradually applied positive coupling in that the coupling means move substantially in the direction in which the force is exerted by the centrifugally influenced means. The direction of the forces and of the movement for coupling are relatively complementary, causing coupling with less resistance than in other types of speed-responsive clutches wherein the centrifugal forces are employed to move the coupling means substantially perpendicularly or longitudinally to the direction of those forces.

Another object is to provide a speed responsive clutch having a combination comprising a plurality of coupling shoes adapted for rotation by a power source and mounted for radial movement so as to be movable in the direction of centrifugal forces, together with centrifugally influenced means rotatable with the power source and comprising a plurality of centrifugally affected masses, one for each shoe, and means between the shoes and the masses for gradually and increasingly multiplying the centrifugal forces acting on the masses as the power source is accelerated, providing smooth and positive actuation of the shoes for drivingly coupling the power source with the clutch output member.

Another object is to provide a clutch with centrifugally influenced means and a plurality of coupling shoes operated thereby for drivingly coupling the clutch input member rotatable by a power source, with the clutch output member when the power source has attained a predetermined speed of rotation, together with universal means connected to for causing the couplers to move in synchronism and with damping means operatively connected to the universal means for controlling the rate of application of the couplers for coupling.

Another object is to provide a speed responsive clutch having a clutch member secured to the output member, a plurality of couplers arranged to rotate with the input member which is rotatable by a source of power, centrifugally influenced means rotatable by the input member and adapted to cause the couplers to drivingly couple the clutch member when the power source has attained a predetermined speed of rotation, and adjustable yielding means for connecting the centrifugally influenced means with each coupler for cushioning the coupling action of the couplers and also providing means for independently adjusting each coupling member or shoe for regulating the moment of coupling of each shoe.

Further objects and advantages of this invention will be apparent from consideration of the specification as illustrated by the accompanying drawings of an illustrative embodiment of the invention, in which drawings:

Fig. 2 is a transverse cross-section of the speed-responsive clutch mechanism taken along the line 2—2 of Fig. 1, looking rearwardly, the clutch being shown in the disengaged position;

Fig. 3 is a horizontal cross-sectional view of parts of the clutch mechanism taken along the line 3—3 of Fig. 2, the clutch parts being shown in the disengaged position;

Fig. 4 is a cross-section similar to Fig. 2 but showing the clutch in engaged position;

Fig. 8 is an elevation of some of the parts of the speed-responsive clutch mechanism, looking forward, the clutch being in ineffective position;

Fig. 9 is a cross-section taken on the line 9—9 of Fig. 8;

Fig. 10 is an elevation of some of the parts of the speed-responsive clutch mechanism, the clutch being in ineffective position;

Fig. 11 is a cross-sectional view taken along the line 11—11 of Fig. 10;

Fig. 12 is an elevation of some of the parts of the speed-responsive clutch (looking forward) in ineffective position;

Fig. 13 is a cross-section taken along the line 13—13 of Fig. 12;

Fig. 14 is an elevation of some of the parts of the speed-responsive clutch (looking forward), the parts being shown in ineffective position;

Fig. 15 is a cross-section taken along the line 15—15 of Fig. 14;

Fig. 16 is another elevation of some of the parts of the speed-responsive clutch mechanism (looking forward) in ineffective position;

Fig. 17 is a cross-sectional view taken along the line 17—17 of Fig. 16.

Figure 1:
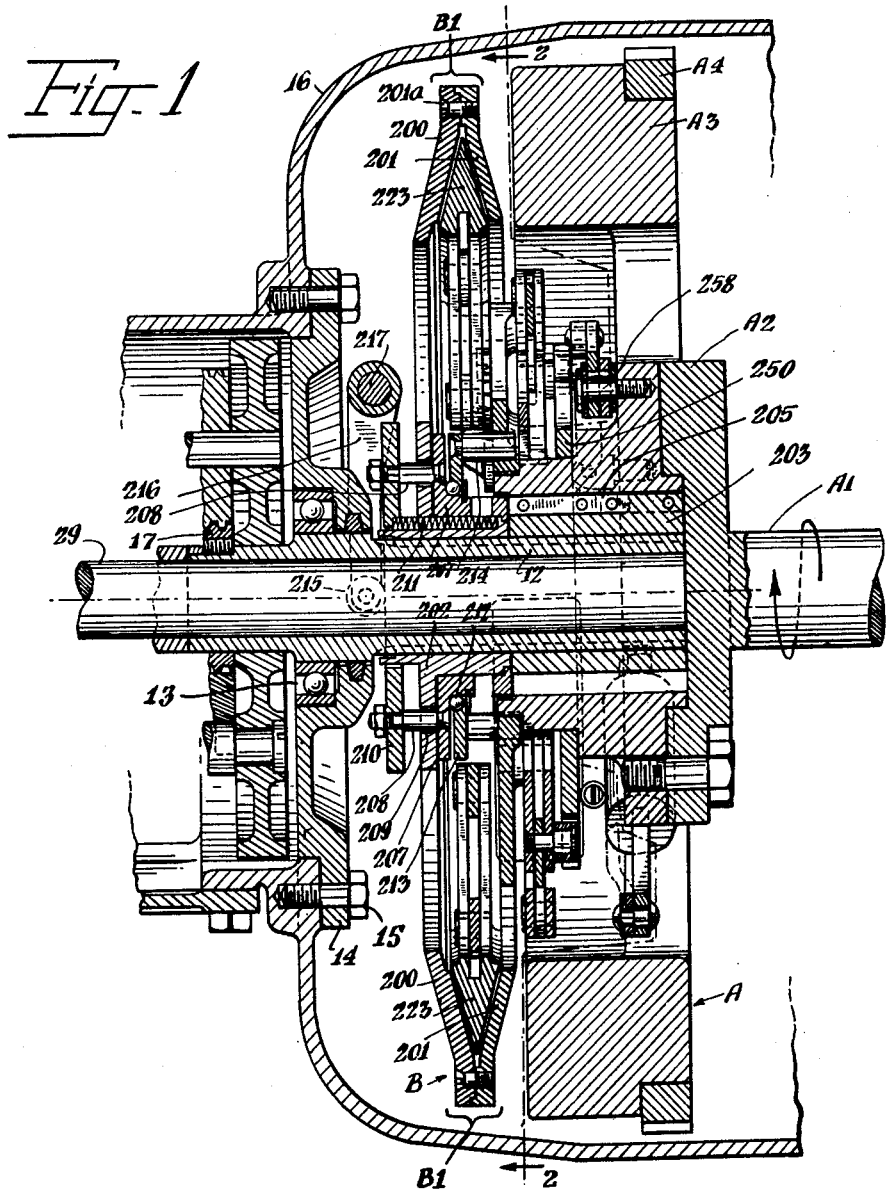
Fig. 1 is a fragmentary longitudinal section of the clutch, taken along the line 1—1 of Fig. 2.

Referring to the drawings (Fig. 1), A refers generally to the power input means which may consist of the crank shaft A1 of an internal combustion engine formed with a flange A2 to which is shown bolted a flywheel A3 which may have a starter ring gear A4. B indicates generally a clutch which is so constructed that it engages to connect the flywheel A3 to the clutch output member 12 to drive said member 12 whenever the flywheel (and engine) attain a predetermined speed of rotation, and also whenever external forces exert reverse torque on the output member 12 and tend to rotate the member forwardly relative to the flywheel A3 and the engine to drive the flywheel and engine, irrespective of the rotative speeds of the flywheel and engine. No provision is disclosed for manually engaging the clutch nor for manually disengaging the clutch. Means are provided, however, to prevent the engagement of the clutch, irrespective of rotative speeds.

The clutch output member 12, as illustrated, is the input member of a transmission and is secured to transmission gear 17. No manual control is provided for altering this joined relation between the clutch and transmission. Member 12 may be a sleeve rotatable on a shaft 29 of the transmission. The sleeve may be journaled as through ball bearing 13 in a plate 14 bolted as at 15 to the housing 16 which housing serves to enclose the flywheel and the clutch, and which, as indicated, may also house the transmission.

B-1 designates the driven clutch member comprising the spider 200 (Figs. 1, 4, 8, 9) and the conical ring 201 (Figs. 1, 4, 8, 9) secured together as by screws 210a. The spider 200 is formed with a hub 202 splined to the output sleeve 12. As shown, the inner surface of ring 201 and the ring portion of spider 200 are conically formed and receive therebetween one or more clutching shoes 223 to be described later.

Figure 7:
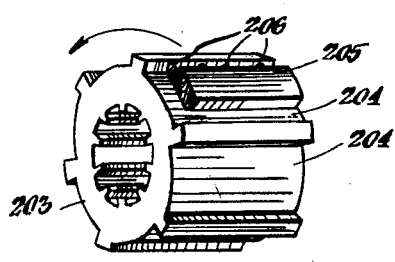
Fig. 7 is a perspective view showing the one-way drive connecting parts.

Also splined to the sleeve 12 and located forwardly of the hub portion 202 is the collar 203 (shown in perspective in Fig. 7). This collar is formed with a plurality of recesses 204 having a spirally arranged bottom surface upon which rest clutching shoes 205 which are spring-pressed by springs 206 in an uphill direction with respect to said spiral surface. The outer diameter of collar 203 fits within a bore in the flywheel A3 (Fig. 1) with the clutching shoes 205 bearing within said bore. It will be seen that this forms a one-way connecting means of more or less usual construction. It is to be noted, however, that this one-way clutch means is so arranged that it cannot transmit forward rotation from the engine to the sleeve 12. It does, however, come into play when torque is applied to drive the output sleeve 12 forwardly of the engine while the main clutch is ineffective for coupling the power source with the sleeve 12 as when the engine is operating below the aforementioned predetermined coupling speeds, or as when the engine is not operating at all, or as when, irrespective of the speeds of the engine, the means for preventing engagement of the main clutch (to be described hereafter) is effective. Under such conditions, the sleeve 12 turns collar 203 which, through clutch shoes 205, applies torque to the flywheel so as to rotate the engine forwardly either for starting the engine or for utilizing the engine as a restraining means at all times.

The numeral 207 (Figs. 1, 3, 6, 9) designates a ring journaled upon the exterior of hub 202. It carries a plurality of screw studs 208 which pass through holes 209 in the spider 200 and are attached at their rearward end to a ring 210 which ring, together with the ring 207, are axially slidable to a limited extent. 211 indicates springs normally holding said rings 207 and 210 in the rearward position shown. However, they may be moved forwardly at will by rollers 215 (Fig. 1) bearing on ring 210, said rollers being carried on arms 216 mounted for oscillation by the transverse shaft 217.

The numeral 212 (Figs. 1, 6) designates ball bearings between the ring 207 and a ring 213 which is connected for rotation with the flywheel and carries a plurality of pins 214 (Fig. 1) which, when in their forward position, serve to prevent engagement of the speed-responsive main drive clutch (see also Figs. 2, 3, 4 and 12).

229 (Figs. 16 and 17) designates screws fastened into the flywheel A3. Said screws serve to attach to the flywheel for rotation therewith the spider 221 (see also Figs. 10 and 12). Said spider is formed with the three arms 222. Supported by each of said arms is a conical clutch coupler or shoe 223 provided with a radial arm 224 (see also Figs. 5, 8, 9, 10 and 11). The inner end of said arm 224 is pivoted to the carrier link 225 which is pivoted at 225a to the spider 221. The outer end of arm 224 has pivoted thereto a carrier link 226 preferably parallel to link 225 and pivoted loosely on shaft 226a. It is formed with an extension arm 227. Firmly attached to shaft 226a is the arm 228 which has attached thereto a bolt 229 passing through the end of arm 227 and provided with adjusting nuts 230 between which and the arm 227 is the coil compression spring 231. Said spring, of course, tends to bring the arms 227 and 228 together. This convergent movement is limited by means of adjusting screw 232 held in adjusted position by lock nut 233.

It will be noted that the clutch shoes 223 are thus adjustably mounted for radial movement so that when they move outwardly they will engage with the conical recess formed in clutch member B-1 (Fig. 1). Centrifugal means are provided to cause such engagement. Such means, in the form shown, act through oscillating shaft 226a (clockwise, as viewed in Fig. 5). Such oscillation tends to move arm 228 therewith and through bolt 229 and spring 231 causes more or less corresponding movement of arm 227 which forces the clutch shoes 223 outwardly for engagement. The spring 231 also assures that such action is properly cushioned. Nuts 230 permit adjustment of the pressure with which the couplers are initially applied and the set screw 232 provides for adjustment of their positions relative to the cooperating member B-1, as may be desired, for regulating the moment of coupling of each coupler (see also Fig. 8), that is, the instant each coupler effectively clutches the clutch member. In other words, each coupler can be adjusted to drivingly couple the clutch member B-1 at a predetermined extent of movement of the respective arms 227—228 in response to actuation by centrifugally influenced means which will now be described.

Referring now to Figs. 2, 4, 5, 12, 14 and 15, 240 designates a weight, three of which are shown. These are so mounted that they may move outwardly under the action of centrifugal force and, in so doing, rotate shaft 226a to move the clutch shoes outwardly. Each of the weights 240 is carried by L-shaped arm 241 pivoted at 242 to a link 243 which is secured to shaft 226a. The end of arm 241 is pivoted at 244 to a link 245 pivoted at 246 to the spider 221. Thus, arm 241 and link 245 form a toggle joint also known as a toggle through which gradual and increasing force multiplication is secured. Each link 245 is provided with an extension nose 247. These noses lie adjacent the locking pins or bolts 214 (Figs. 1, 2, 4, 5 and 12). When the weights 240 are in their normal inward position (Figs. 2 and 12), the noses 247 are sufficiently far from the crank shaft axis so that locking bolts 214 may be moved thereunder (by moving shaft 217 and parts connected thereto). If this is done, the weights are prevented from flying out and the couplers from engaging, irrespective of the speed at which the flywheel is rotated.

It will be noted that if the engine is speeded up while the pins 214 are in effective position where they are engaged by the noses 247 on link 245, the effect of centrifugal force acting on weights 240 is such that the pins 214 cannot be withdrawn due to the grip of the noses 247 thereon until rotative speeds are first reduced below a certain rate. This coaction between pins 214 and extension 247 prevents undesirable damaging stresses and strains in the clutch and parts driven thereby which would occur if coupling were permitted while the engine was accelerated to speeds above normal coupling speeds.

It will also be noted that if the engine is speeded up sufficiently to cause coupling while the pins 214 are in their rearward ineffective position, extensions 247 will serve to prevent adjustment of pins 214 forwardly to effective position until rotative speeds are first reduced below a certain rate. As can best be seen in Fig. 4, the extensions 247, at such times, align with pins 214 so as to form an abutment to prevent forward movement of the pins to effective coupling preventing position.

250 designates a synchronizing spider (Figs. 2, 4, 14 and 16) which is formed with extension arms 251, each having a notch 252 (Figs. 5, 14) therein receiving the pivot pin 244, previously referred to, which serves as a central pivot for the toggle consisting of links 245 and 241.

Figure 5:
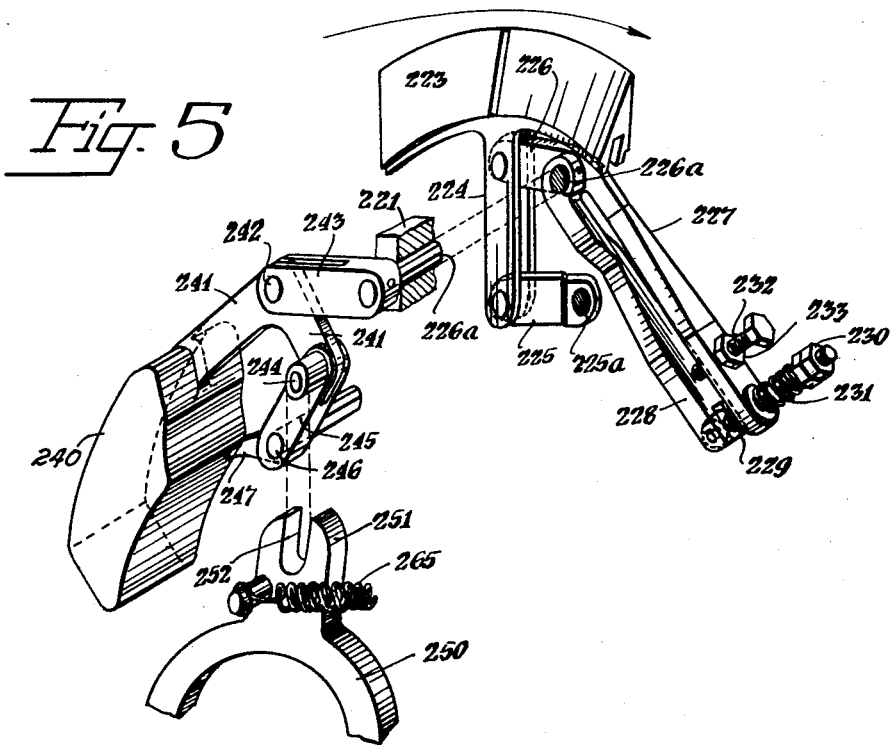
Fig. 5 is an expanded perspective view of a portion of the clutch mechanism, the clutch being in ineffective position.
Figure 6:
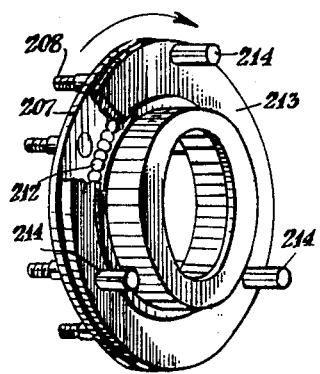
Fig. 6 is a fragmentary perspective view showing parts of the clutch engagement preventing mechanism.

It will be seen that if the weights 240 are caused to move outwardly by centrifugal forces, the synchronizing spider 250 will move clockwise (Figs. 14 and 16) or counter-clockwise (as viewed in Figs. 2, 4 and 5).

The spider 250 not only performs the function of causing the three weights to move in synchronism but it also serves as a universal member to which damping mechanism may be applied. For this purpose, a link 255 (Figs. 2, 3, 4, 15, 16) is pivoted to the synchronizing spider 250 at 256. Its other end is pivoted to a crank arm 257 pivoted on the flywheel at 258 (Figs. 2, 4, 16). Attached to arm 257 is the arm 259 which is pivoted to the piston rod 260 of a dashpot 261. This dashpot serves to prevent sudden engagement of the clutch shoes so that a smooth easy clutch engagement is secured.

Suitable spring means are provided to prevent weights 240 from actuating clutch shoes 223 outwardly for engagement until desired revolutions of the flywheel are attained. Such spring means will also serve to return the weights 240 toward the center when the flywheel speed drops to a certain point. This may be done by means of a spring within the dashpot or a spring attached to arm 259 or, as shown in Figs. 2, 3, 4, 5, 14, 17 by means of a plurality of springs 265 attached to bolts 265a passing through lugs 266 on the flywheel and held in adjustable position by means of adjusting nuts 267. Adjustment of nuts 267 serves to either increase or decrease the tension on springs 265 for regulating the restraint thereof on the weights 240 and the couplers 223 connected therewith against the influence of centrifugal forces until the flywheel is rotating at a desired coupling speed, thereby coupling or drag-coupling is prevented at all speeds below such coupling speed.

It will be seen that by the means shown and described, a speed-responsive main drive clutch is provided which operates in such a manner that when the engine speed is below a predetermined rate there will be no driving connection from the engine to the member to be driven thereby (sleeve 12 in the present instance) but that torque in the forward direction may be transmitted from sleeve 12 to the flywheel. Furthermore, when the flywheel is speeded up to a certain rate, the clutch couplers will be gradually and smoothly engaged with their cooperating recess so that clutch member B-1 and output sleeve 12 will be gradually and smoothly brought to rotation at flywheel speed. Furthermore, if desired, such engagement of the clutch may be prevented by manually or otherwise controllable means such as shaft 217. This insures a definite disablement which is useful in engine testing or at any time when it is desired to speed up the engine without having drive coupling or even drag coupling in the clutch.

It will be further noted that the disclosed combinations of clutch mechanisms, when embodied in a vehicle, will serve to utilize the engine as a restraining means for controlling the vehicle while the vehicle is in motion and is exerting torque on clutch output member 12. Under such conditions the torque will be applied through clutch member B-1 and couplers 223 to the engine if the main clutch is engaged; however, if not engaged, the torque is applied to the engine through the output member and the clutch input member A3 by means of the one-way drive coupling. In the same manner, the one-way coupling serves to utilize the engine while it is not operating for holding the vehicle stationary as when it is parked on a down-hill slope. It will also be noted that the one-way connection will also serve for rotating the engine to start the engine by creating forward torque on output member 12, and that with the clutch preventing means adjusted to effective position, the started engine may be speeded up without driving the output member 12.

It will be noted that the construction shown and described will serve admirably to accomplish the objects stated above. It is to be understood, however, that the constructions disclosed above are intended merely as illustrative of the invention and not as limiting, as various modifications therein may be made without departing from the invention as defined by proper interpretation of the claims which follow.

I claim:

1. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said carrier and a connection between said arms having resilient means tending to converge said arms for relative movement in one direction and serving to cushion the coupling action, and an adjustable abutment for controlling the extent of convergence of said arms for regulating the moment of coupling; and centrifugally-operated means so arranged as to rotate with said power source comprising centrifugally influenced means and a toggle connected to said shaft and adapted for actuation by said influenced means so as to gradually and increasingly multiply the force exerted by said influenced meatns for operating said means for rocking to drivingly couple said coupler with said clutch member when said power source has attained a predetermined speed of rotation.

2. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said carrier and a connection between said arms for relative movement of said arms and adapted for controlling the coupling action; and centrifugally operated means so arranged as to rotate with said power source comprising centrifugally influenced means and a toggle connected to said shaft and adapted for actuation by said influenced means so as to gradually and increasingly multiply the force exerted by said influenced means for operating said rocking means to drivingly couple said coupler with said clutch member when said power source has attained a predetermined speed of rotation.

3. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said carrier and a connection between said arms for relative movement of said arms and adapted for controlling the coupling action; and centrifugally operated means so arranged as to rotate with said power source comprising centrifugally influenced means and means connected to said shaft and adapted for actuation by said influenced means so as to gradually and increasingly multiply the force exerted by said influenced means for operating said rocking means to drivingly couple said coupler with said clutch member when said power source has attained a predetermined speed of rotation.

4. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said carrier and a connection between said arms having resilient means tending to converge said arms for relative movement in one direction and serving to cushion the coupling action, and an adjustable abutment for controlling the extent of convergence of said arms for regulating the moment of coupling; and centrifugally operated means connected to said shaft and so arranged as to rotate with said power source for operating said rocking means to drivingly couple said coupler with said clutch member when said power source has attained a predetermined speed of rotation.

5. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said carrier and a connection between said arms having resilient means tending to converge said arms for relative movement in one direction and serving to cushion the coupling action, and an abutment serving to limit such convergence; and centrifugally operated means connected to said shaft and so arranged as to rotate with said power source for operating said rocking means to drivingly couple said coupler with said clutch member when said power source has attained a predetermined speed of rotation.

6. In a speed-responsive clutch having an output member and means for at times coupling a power source with said output member, said means comprising a clutch member connected to said output member, at least one drive coupler adapted to couple with said clutch member, said coupler being pivotally mounted on a carrier having pivotal connection to a support member rotatable with said power source, means for rocking said carrier about said pivotal connection to cause said coupler to move relative to said clutch member, said means comprising a shaft coaxial with said pivotal connection, an arm secured to said shaft, an arm attached to said shaft, an arm attached to said carrier and a connection between said arms adapted for controlling relative movement of said arms and for controlling the coupling action; and centrifugally operated means connected to said shaft and so arranged as to rotate with said power source for operating said rocking means to drivingly couple said coupler with said clutch member when said power source has attained a predetermined speed of rotation.

7. In a speed-responsive clutch having an output member and means for at times coupling a power source with said output member, said means comprising a clutch member connected to said output member, a plurality of drive couplers adapted to rotate with said power source and to couple with said clutch member, centrifugally-operated means so arranged as to rotate with said power source and to gradually and increasingly multiply the effectivity of the centrifugal forces for operating said coupler to drivingly couple with said clutch member when said power source has attained a predetermined speed of rotation, a damping means connected to said centrifugally-operated means for synchronously damping the rate of application of said couplers, and an adjustable means between each of said couplers and said centrifugally-operated means for varying the moment of coupling of each coupler with said clutch member.

8. In a speed-responsive clutch having an output member and means for at times coupling a power source with said output member, said means comprising a clutch member connected to said output member, at least one drive coupler adapted to rotate with said power source and to operate radially for coupling with said clutch member, preventing means adjustable at times to be effective or ineffective for preventing coupling, centrifugally-operated means so arranged as to rotate with said power source and comprising centrifugally influenced means and a toggle connected to said coupler and adapted for actuation by said influenced means so as to gradually and increasingly multiply the force exerted by said influenced means for operating said coupler to drivingly couple with said clutch member when said power source has attained a predetermined speed of rotation, said toggle comprising means adapted to so coact with said preventing means that when said preventing means is adjusted so as to be effective, operation of said centrifugally-operated means and therefore coupling of said coupler with said clutch member is prevented irrespective of rotative speeds, and that when rotative speeds are above a certain rate, said preventing means, if effective, is not adjustable to ineffective position, or if said preventing means is ineffective, it is not adjustable to effective position until rotative speeds have first been reduced below a certain magnitude.

9. In a speed-responsive clutch having an output member and means for at times coupling a power source with said output member, said means comprising a clutch member connected to said output member, at least one drive coupler adapted to rotate with said power source and to operate radially for coupling with said clutch member, preventing means adjustable at times to be effective or ineffective for preventing coupling, centrifugally-operated means so arranged as to rotate with said power source for operating said coupler to drivingly couple with said clutch member when said power source has attained a predetermined speed of rotation, said last-mentioned means comprising means adapted to so coact with said preventing means that when said preventing means is adjusted so as to be effective, operation of said centrifugally-operated means and therefore coupling of said coupler with said clutch member is prevented irrespective of rotative speeds, and that when rotative speeds are above a certain rate, said preventing means, if effective, is not adjustable to ineffective position, or if said preventing means is ineffective, it is not adjustable to effective position until rotative speeds have first been reduced below a certain magnitude.

10. In a speed-responsive clutch having an output member and means for at times coupling a power source with said output member, said means comprising a clutch member connected to said output member, at least one drive coupler adapted to rotate with said power source and to operate radially for coupling with said clutch member, means effective at times for preventing the coupling of said coupler and said clutch member irrespective of the rotative speeds of said power source, and centrifugally-operated means so arranged as to rotate with said power source, comprising centrifugally influenced means and a toggle connected to said coupler and adapted for actuation by said influenced means so as to gradually and increasingly multiply the force exerted by said influenced means for operating said coupler to drivingly couple with said clutch member when said power source has attained a predetermined speed of rotation, said last-mentioned means being also adapted to so coact with said preventing means that when said preventing means is effective, operation of said centrifugally-operated means and therefore the coupling of said coupler and said clutch member is prevented.

11. In a speed-responsive clutch having an output member and means for at times coupling a power source with said output member, said means comprising a clutch member connected to said output member, at least one drive coupler adapted to rotate with said power source and to operate radially for coupling with said clutch member, means effective at times for preventing the coupling of said coupler and said clutch member irrespective of the rotative speeds of said power source, and centrifugally-operated means so arranged as to rotate with said power source for operating said coupler to drivingly couple with said clutch member when said power source has attained a predetermined speed of rotation, said last-mentioned means being adapted to so coact with said preventing means that when said preventing means is effective operation of said centrifugally-operated means and therefore the coupling of said coupler with said clutch member is prevented.

12. In a speed-responsive clutch having an output member and means for at times coupling a power source with said output member, said means comprising a clutch member connected to said output member, at least one drive coupler adapted to rotate with said power source and to operate radially for coupling with said clutch member, means effective at times for preventing the coupling of said coupler and said clutch member irrespective of the rotative speeds of said power source, and centrifugally-operated means so arranged as to rotate with said power source for operating said coupler to drivingly couple with said clutch member when said power source has attained a predetermined speed of rotation, said last-mentioned means being adapted to so coact with said preventing means that when said preventing means is effective operation of said centrifugally-operated means and therefore the coupling of said coupler with said clutch member is prevented, and a one-way connecting means so arranged as to be effective for coupling said output member to said power source when torque acting through said output member tends to rotate said output member forwardly relative to said power source at times when said coupler and said clutch member are not drivingly coupled as when said power source is operating below said predetermined speed or is not operating at all, or as when, irrespective of the speeds of said power source, said means for preventing coupling is effective, said connecting means being also arranged as to be ineffective for coupling said output member to said power source whenever said power source tends to rotate forwardly relative to said output member, whereby, either through the coupled coupler and said clutch member or, when such coupling is not through said one-way connecting means, said power source is utilized at all times as a restraining means whenever the output member attempts to rotate forwardly relative to the power source.

13. In a speed-responsive clutch having an output member and means for at times coupling a power source with said output member, said means comprising a clutch member connected to said output member, at least one drive coupler adapted to rotate with said power source and to couple with said clutch member, said coupler being carried for generally rectilinear movement by two substantially parallel members one end of each of which is pivoted to said coupler at spaced points and the other ends of each of which are pivoted to a support member rotatable with said power source, and centrifugally-operated means so arranged as to rotate with said power source comprising centrifugally influenced means and a toggle connected to one of said parallel members and adapted for actuation by said influenced means so as to gradually and increasingly multiply the force exerted by said influenced means for operating said connected parallel member about its second-mentioned pivot to cause generally rectilinear movement of said coupler relative to said clutch member for drivingly coupling said clutch member when said power source has attained a predetermined speed of rotation.

14. In a speed-responsive clutch having an output member and means for at times coupling a power source with said output member, said means comprising a clutch member connected to said output member, at least one drive coupler adapted to rotate with said power source and to couple with said clutch member, said coupler being carried for generally rectilinear movement by two substantially parallel members one end of each of which is pivoted to said coupler at spaced points and the other ends of each of which are pivoted to a support member rotatable with said power source, and centrifugally-operated means so arranged as to rotate with said power source comprising centrifugally influenced means and means connected to one of said parallel members and adapted for actuation by said influenced means so as to gradually and increasingly multiply the force exerted by said influenced means for operating said connected parallel member about its second-mentioned pivot to cause generally rectilinear movement of said coupler to said clutch member for drivingly coupling said clutch member when said power source has attained a predetermined speed of rotation.

15. In a speed-responsive clutch having an output member and means for at times coupling a power source with said output member, said means comprising a clutch member connected to said output member, at least one drive coupler adapted to rotate with said power source and to couple with said clutch member, said coupler being carried for generally rectilinear movement by two substantially parallel members one end of each of which is pivoted to said coupler at spaced points and the other ends of each of which are pivoted to a support member rotatable with said power source, and centrifugally-operated means so arranged as to rotate with said power source for actuating one of said parallel members about its second-mentioned pivot to cause generally rectilinear movement of said coupler relative to said clutch member for drivingly coupling said clutch member when said power source has attained a predetermined speed of rotation.

16. In a speed-responsive clutch having an output member and means for at times coupling a power source with said output member, said means comprising a clutch member connected to said output member, at least one drive coupler adapted to rotate with said power source and to couple with said clutch member, centrifugally-operated means so arranged as to rotate with said power source for operating said coupler to drivingly couple with said clutch member when said power source has attained a predetermined coupling speed of rotation, said last mentioned means comprising a centrifugally influenced means, an operating member connected thereto, an operated member connected to said coupler and connections between said members including resilient means for convergingly holding said operated member with said operating member so that said operated member is moved by said operating member for the drive coupling actuation of said coupler, said resilient means also serving to cushion the coupling action, and including an adjustable abutment for controlling the extent of convergence of said members thereby to regulate the coupler to couple with the clutch member at a predetermined extent of operation of said centrifugally-operated means; and an adjustable means connected to said centrifugally influenced means for restraining said centrifugally-operated means against the influence of centrifugal forces until the power source is rotating at a desired coupling speed and for holding said centrifugally-operated means in a normal position when the power source is rotating below certain speeds or is not rotating.

17. In a speed-responsive clutch having an output member and means for at times coupling a power source with said output member, said means comprising a clutch member connected to said output member, a plurality of drive couplers adapted to rotate with said power source and to couple with said clutch member, centrifugally-operated means so arranged as to rotate with said power source for operating said couplers, a plurality of connections between said centrifugally influenced means and each of said couplers, each connection comprising adjustable resilient means serving to regulate the pressure with which the couplers are applied and to cushion the coupling action of each coupler, and an adjustable abutment for controlling the position of the respective coupler relative to said clutch member thereby to regulate that coupler to couple with said clutch member at a predetermined extent of operation of said centrifugally-operated means; and an adjustable restraining means connected to said connections so as to control the connections for synchronous movement of said couplers, said restraining means being adjustable so as to prevent any coupling until the power source is rotating at a desired speed.

18. In a speed responsive clutch having a rotary power source, an output member, a clutch member connected to said output member, at least one drive coupler means adapted to rotate with said power source and to move to couple with said clutch member for rotating the same, centrifugally-operated coupler moving means rotated by said power source for moving said coupler to drivingly couple with said clutch member when said power source has attained a predetermined speed of rotation, said centrifugally-operated means comprising at least one centrifugally movable mass, an operating element connected to said mass for actuation upon movement thereof, an operated element connected to said coupler for moving the same, yieldable resilient clamping means connected to one of said elements and engaging the other of said elements for yieldably urging said operated element toward said operating element, whereby said operated element is resiliently biased to move with said operating element for drivingly coupling said coupler with said clutch member upon separation of said element, abutment means carried on one of said elements for engagement with the other of said elements, and adjustment means on said abutment means for predetermining the minimum interval between said elements, thereby to regulate the moment of coupling.

19. In a speed-responsive clutch having a rotary power source, an output member; a clutch member connected to said output member; at least one drive coupler means adapted to rotate with said power source and to move to couple with said clutch member for rotating the same; and centrifugally operated coupler moving means rotated by said power source for moving said coupler to drivingly couple with said clutch member when said power source has attained a predetermined speed of rotation, said centrifugally operated means comprising at least one centrifugally movable mass, an operating element connected to said mass for actuation upon movement thereof, an operated element connected to said coupler for moving the same, adjustable yieldable clamping means connected to one of said elements for enslavingly engaging the other of said elements for yieldably urging said operated element toward said operating element, whereby said operated element is resiliently biased to move in the same direction as said operating element for drive encouplement of said coupler with said clutch member, said clamping means yieldingly accommodating subsequent to initial contact of said coupler with said clutch member for cushioning the coupling action, abutment means carried by one of said elements and engaging the other of said elements for limiting the minimum interval between said elements when they are at rest, and adjustment means on said yieldable clamping means for predetermining the yieldability thereof upon application of engagement forces, thereby to control the degree of cushioning of the drive coupling action.

20. In a speed-responsive clutch having a rotary power source, a rotatable clutch member, a plurality of drive couplers connected to rotate with said power source and to move to couple with said clutch member for rotating the same, centrifugally-operated coupler moving means connected to rotate with said power source and comprising centrifugally influenced force exerting means and a plurality of toggles, each of said toggles being individual to a coupler and connected thereto, said toggles being connected for actuation to said influenced means and to gradually and increasingly multiply the force exerted by said influenced means for moving said couplers to drivingly couple with said clutch member when said power source has attained a predetermined speed of rotation, a synchronizing universal member interconnecting said toggles and turnably movable relative to said power source on movement of any toggle for synchronizing movement of all toggles and through them of said couplers, and at least one damping means carried by said power source for rotation therewith and connected to said universal member for at all times damping movement thereof, and therethrough controlling the rate of movement of said couplers continuously from rest position through completion of drive engagement.

21. In a speed responsive clutch having a rotary power source, a rotatable clutch member, a plurality of drive couplers connected to rotate with said power source and to move to couple with said clutch member for rotating the same, centrifugally-operated coupler moving means connected to rotate with said power source and comprising centrifugally influenced force exerting means and a plurality of coupler connecting means, each of said coupler connecting means being individual to a coupler and connected thereto, said coupler connecting means being connected for actuation to said influenced means for gradually and increasingly multiplying the force exerted by said influenced means for moving said couplers to drivingly couple with said clutch member when said power source has attained a predetermined speed of rotation, a synchronizing universal member interconnecting each of said coupler connecting means and turnably movable relative to said power source on movement of any connecting means for synchronizing movement of all connecting means and through them of said couplers, and at least one damping means carried by said power source for rotation therewith and linked to said universal member for damping movement thereof and therethrough controlling the rate of movement of said couplers continuously from rest position through completion of drive engagement.

22. In a speed-responsive clutch having a rotatable power source, a rotatable clutch member, a plurality of drive couplers connected to rotate with said power source and to move to couple with said clutch member for rotating the same, centrifugally operated coupler moving means carried for rotation by said power source and comprising centrifugally influenced force exerting means and a plurality of linkages, each of which linkages is individual to a coupler and is connected thereto, said linkages being connected for actuation to said force exerting means for operating said couplers to drivingly couple with said clutch member when said power source has attained a predetermined speed, a synchronizing universal member interconnecting said linkages and turnably movable relative to said power source on movement of any of said linkages for synchronizing movement of all said linkages and through them of said couplers, and at least one damping means carried by said power source for rotation therewith and connected to said universal member for damping movement thereof and therethrough controlling the rate of movement of said couplers continuously from rest position through completion of drive coupling.

23. In a speed-responsive clutch having a rotary power source, a rotatable clutch member, a plurality of drive couplers connected to rotate with said power source and to move to couple with said clutch member for rotating the same, centrifugally-operated force exerting means carried for rotation by said power source and movable for moving said couplers to drivingly couple with said clutch member when said power source has attained a predetermined speed of rotation, synchronizing universal means interconnecting said couplers and turnably movable relative said power source on movement of any coupler for synchronizing movement of all couplers, and at least one damping means carried by said power source for rotation therewith and connected to said synchronizing means for controlling the movement thereof and therethrough controlling the rate of movement of said couplers continuously from rest position through completion of drive engagement.

24. In a speed-responsive and torque-responsive automatic clutch for coupling a power source to a transmission whenever said power source attains a predetermined speed of rotation and for coupling said transmission to said power source whenever said transmission tends to rotate forwardly relative to said power source, a clutch member, an output member permanently interconnecting said clutch member and said transmission for rotary movement together for transmitting rotative forces to and from said transmission whenever such forces occur, at least one drive coupler connected to rotate with said power source and to move into coupled engagement with said clutch member for rotating the same, centrifugally-operated coupler moving means carried for rotation by said power source and comprising centrifugally influenced force exerting means movable by centrifugal force from a normal inner position to an outer position, and toggle means connected to said coupler and to said force exerting means to gradually and increasingly multiply the force exerted by said force exerting means for moving said coupler to drivingly couple with said clutch member, locking means carried by said power source and movable from an ineffective position to an effective position for engaging said coupler moving means for locking its said influenced means in said inner position irrespective of rotative speeds of said power source so as to block coupling of said coupler with said clutch member, and one-way clutch means carried by said output member for rotation at all times therewith and for engaging said output member with said power source therethrough whenever rotative forces from said transmission turn said output member forwardly of said power source whereupon the opposing influence of the lagging power source is effective to restrain such rotation of said output member.

25. In a speed-responsive and torque responsive automatic clutch for coupling a power source to a transmission whenever said power source attains a predetermined speed of rotation and for coupling said transmission to said power source whenever said transmission tends to rotate forwardly relative to said power source, a clutch member, an output member permanently interconnecting said clutch member and said transmission for rotary movement together for transmitting rotative forces to and from said transmission whenever such forces occur, at least one drive coupler connected to rotate with said power source and to move into coupled engagement with said clutch member for rotating the same, centrifugally-operated coupler moving means carried for rotation by said power source and including centrifugally influenced force exerting means movable by centrifugal force from a normal inner position to an outer position, said coupler moving means being connected to said coupler for moving the same to drivingly couple with said clutch member when said power source attains a predetermined speed of rotation, locking means carried by said power source and movable from an ineffective position to an effective position for engaging said coupler moving means for locking its said influenced means in said inner position irrespective of rotative speeds of said power source so as to block coupling of said coupler with said clutch member, and one-way clutch means carried by said output member for rotation at all times therewith and for engaging said output member with said power source therethrough whenever rotative forces from said transmission turn said output member forwardly of said power source whereupon the opposing influence of the lagging power source is effective to restrain such forward rotation of said output member.

References Cited in the file of this patent

UNITED STATES PATENTS 1,136,966    Langdon  ------------ Apr. 27, 1915

(Other references on following page)

UNITED STATES PATENTS

| | | | |
|---|---|---|---|
| 1,587,410 | Pepin | June 1, | 1926 |
| 1,649,728 | Pepin | Nov. 15, | 1927 |
| 1,914,841 | Wood | June 20, | 1933 |
| 2,005,350 | Rickwood | June 18, | 1935 |
| 2,038,450 | Roesch | Apr. 21, | 1936 |
| 2,042,454 | Banker | June 2, | 1936 |
| 2,104,014 | Banker | Jan. 4, | 1938 |
| 2,168,856 | Banker | Aug. 8, | 1939 |
| 2,392,950 | Russell | Jan. 15, | 1946 |

FOREIGN PATENTS

| 754,962 | France | Sept. 4, 1933 |
|---|---|---|